United States Patent [19]

Hazenbroek

[11] Patent Number: 5,045,022
[45] Date of Patent: Sep. 3, 1991

[54] ADJUSTABLE POULTRY BREAST FILLETING SYSTEM

[76] Inventor: Jacobus E. Hazenbroek, Burg de Zeeuwstraat 52, Numansdorp, Netherlands

[21] Appl. No.: 472,790

[22] Filed: Jan. 31, 1990

[51] Int. Cl.$^5$ ............................................. A22C 21/00
[52] U.S. Cl. .................................................... 452/165
[58] Field of Search .................. 17/11, 48; 452/165, 452/150, 170

[56] References Cited

U.S. PATENT DOCUMENTS

| | | | |
|---|---|---|---|
| 4,373,232 | 2/1983 | Harding et al. | 17/11 |
| 4,557,017 | 10/1985 | Gasbarro | 17/11 |
| 4,564,976 | 1/1986 | Beech et al. | 17/11 |
| 4,567,624 | 2/1986 | Van Miel | 17/11 |
| 4,593,432 | 6/1986 | Hazenbroek | 17/11 |
| 4,682,386 | 7/1987 | Hazenbroek et al. | 17/11 |
| 4,873,746 | 10/1989 | Schieler et al. | 17/11 |

*Primary Examiner*—Willis Little
*Attorney, Agent, or Firm*—Thomas, Kerr & Kayden

[57] ABSTRACT

An apparatus (10) for removing breast fillets from previously eviscerated poultry carcasses comprises a frame (11) and a plurality of carcass carriers (20) mounted at spaced intervals on a movable conveyor (12) for moving the carriers along a path. Meat removing means (46, 60, 61, 96) are mounted along the path and movable rotary cutting blades (173, 175) are interposed in the path of the carcass carriers for cutting the partially separated meat into two portions. The rotary cutting blades are adapted to straddle the keel bone of the poultry carcass.

18 Claims, 3 Drawing Sheets

ADJUSTABLE POULTRY BREAST FILLETING SYSTEM

TECHNICAL FIELD

This invention relates to an apparatus for automatically separating meat from the skeletal structure of the breast and adjacent back portions of a previously eviscerated poultry carcass.

BACKGROUND OF THE INVENTION

In the processing of edible poultry, such as chickens and turkeys, it is desirable to separate the meat from the skeletal structure of the poultry carcass so that the meat can be sold separately, without the bone being contained within the meat. The all-meat product can be attractively packaged and sold in relatively small portions which are easy to prepare and eat, without requiring the consumer to separate the meat from the bone.

In the past, the process of filleting poultry products, such as thighs and breasts, has been achieved by hand, with workers manually stripping the meat from the bone. More recently automated equipment has become available which functions to separate the meat from the bone of poultry thighs.

Although automated equipment has been developed which successfully functions to debone poultry thighs, the skeletal structure of the breast and related parts of the poultry carcass are of more complex configuration, and it is more difficult to separate the meat and bone from this portion of the carcass. More recently, automated equipment has been developed which operates to remove the meat from the breast portion of the poultry carcass. For example, U.S. Pat. No. 4,682,386 discloses a system by which previously eviscerated poultry carcasses are automatically filleted, by mounting poultry carcasses with wings and legs removed on a series of mandrels or carcass carriers and moving the carcasses on the carriers along the work path where a series of implements engage and remove the meat from the skeletal structure of the carcass. Equipment of this type tends to separate the meat from the skeletal structure of the carcass while leaving the breast meat in one portion. In the past, it has been necessary to split the breast by hand after removing it from the poultry carcass. While in some situations it may be desirable to allow the breast meat to remain in one portion, in many other situations it is desirable to sever the breast meat into equal parts.

Accordingly, it is seen that a need remains for a poultry breast filleting system which can remove the breast meat from the poultry carcass in one piece or in two pieces as desired. It is to the provision of such a poultry breast filleting system that the present invention is primarily directed.

SUMMARY OF THE INVENTION

Briefly described, the present invention comprises an adjustable poultry breast filleting system. Specifically, the present invention comprises an apparatus for removing fillets from previously eviscerated poultry carcasses from which the legs, wings and skin have been previously removed. The apparatus has a frame and a plurality of carcass carriers mounted at spaced intervals on a movable conveyor for moving the carriers along a path and includes meat removing means mounted along the path and being formed with the shape that corresponds to the profile of the skeletal structure of the poultry for partially separating at least a portion of the meat of the carcass from the skeletal structure thereof. The apparatus further includes cutting means adapted to be interposed in the path of the carcass carriers for cutting the partially separated meat into two portions along a portion of the skeleton of the carcass. Preferably, the cutting means comprise a pair of rotating disc cutters adapted to straddle the keel bone of the poultry carcass. Means are provided for moving the cutting means into the path of the carcass carriers and for moving the cutting means out of the path of the carcass carriers.

With this construction, as the poultry carcasses are moved through the filleting apparatus, the cutting means adapted to be interposed in the path of the carcass carriers can to be selectively moved into position to cut the partially separated meat into two portions or moved into a position to avoid cutting the partially separated meat into two portions, as desired.

Various objects, features and advantages of the invention will become apparent upon reading the following specification when taken in conjunction with the accompanying drawings.

DETAILED DESCRIPTION

Figure 1:
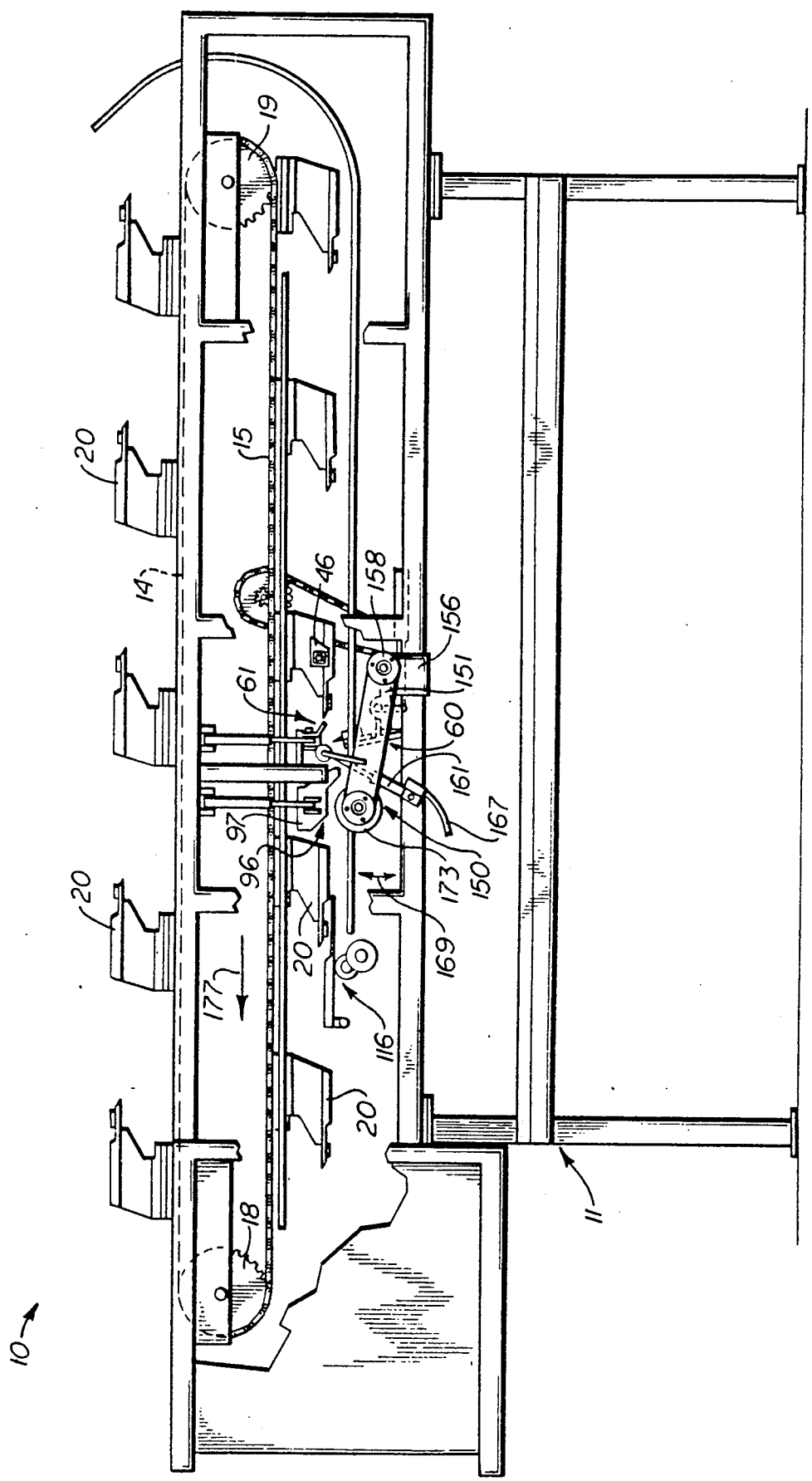
FIG. 1 is a right side elevational view of an adjustable poultry breast filleting system according to the present invention.

Referring now in more detail to the drawings, in which like reference numerals represent like parts throughout the several views, FIG. 1 shows the adjustable poultry breast filleting system 10 in a preferred form. The filleting system 10 includes a framework 11 supporting a continuous conveyor system 12 that includes an upper horizontal flight 14 and a lower horizontal flight 15 formed of a series of hingedly connected conveyor plates. The conveyor plates extend about sprocket elements 18 and 19 which are supported by the framework.

A plurality of mandrels or carcass carriers 20 are mounted in spaced series on the conveyor system by connecting each carcass carrier to one of the conveyor plates. This causes the carcass carriers to be moved in series along an upper horizontal processing path and then along the lower horizontal processing path of the conveyor system. An electric motor (unshown) drives conveyor sprocket 18.

The construction of the individual carcass carriers 20 preferably is such as that disclosed in U.S. Pat. No. 4,682,386, the remainder of the disclosure of which is hereby incorporated by reference. Furthermore, the filleting system comprises a series of work stations where several meat removing implements engage the carcass and tend to pull the meat from the skeletal structures of the carcasses. For example, the first implement comprises a pair of stationary blades indicated at 46 which tend to slice into the meat beginning at the front of the carcass and tend to separate the meat from the skeletal structure of the carcass.

The next such meat removing implement comprises a bottom block assembly 60 and side block assemblies 61 and 62 which are positioned just before the bottom block assembly 60 along the direction of movement of the carriers 20. The side blocks tend to laterally compress the wishbone so that the wishbone will pass through a central slot of the bottom block 60 and the bottom block 60 will not break the wishbone. The bottom block assembly 60 removes a substantial amount of the breast meat from the skeletal structure and the meat clings to the skeletal structure and tends to hang from the skeletal structure.

A tunnel assembly 96 is located next in the path of travel of the carcass carriers 20. Tunnel assembly 96 includes a pair of tunnel plates 98 and 99 of reverse, complementary shape, with each tunnel plate being generally of L-shaped configuration. Each tunnel plate 98 and 99 is mounted on a hinged pivot 105 about a pivot pin 106 and a cylinder 109 functions to pivot each tunnel plate 98 and 99 towards and away from the other tunnel plate 98 and 99.

A fillet catcher 116 is positioned further along the processing path from the tunnel assembly 96. Fillet catcher 116 includes tines that form a slot therebetween, and fillet remover gears. When the carcass carrier 20 approaches the fillet catcher 116, a substantial amount of the meat will have been removed from the skeletal structure still supported on the carcass carrier, and most of the meat will be hanging in a downward direction from the carcass carrier.

Having just described a substantial portion of the apparatus shown in U.S. Pat. No. 4,682,386, attention is now turned to the novel aspects of the present invention.

Figure 2:
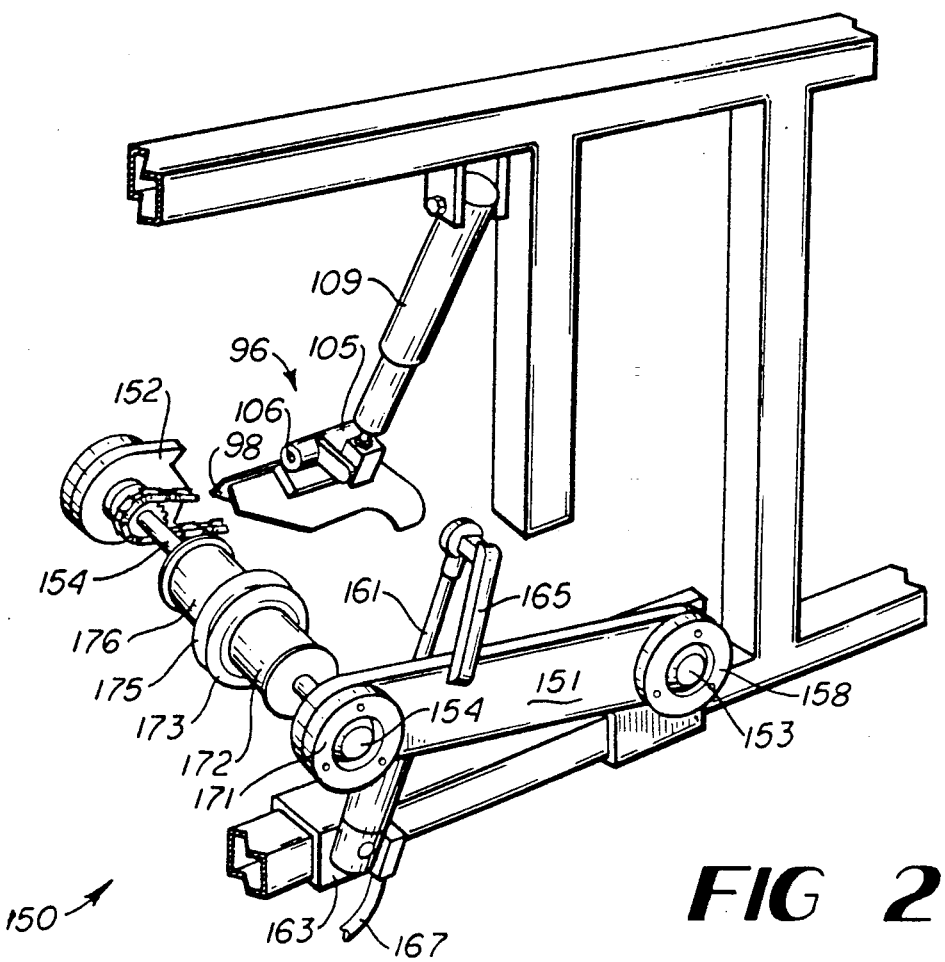
FIG. 2 is a perspective, schematic illustration of a portion of the filleting system of FIG. 1, with some elements removed for clarity.
Figure 3:
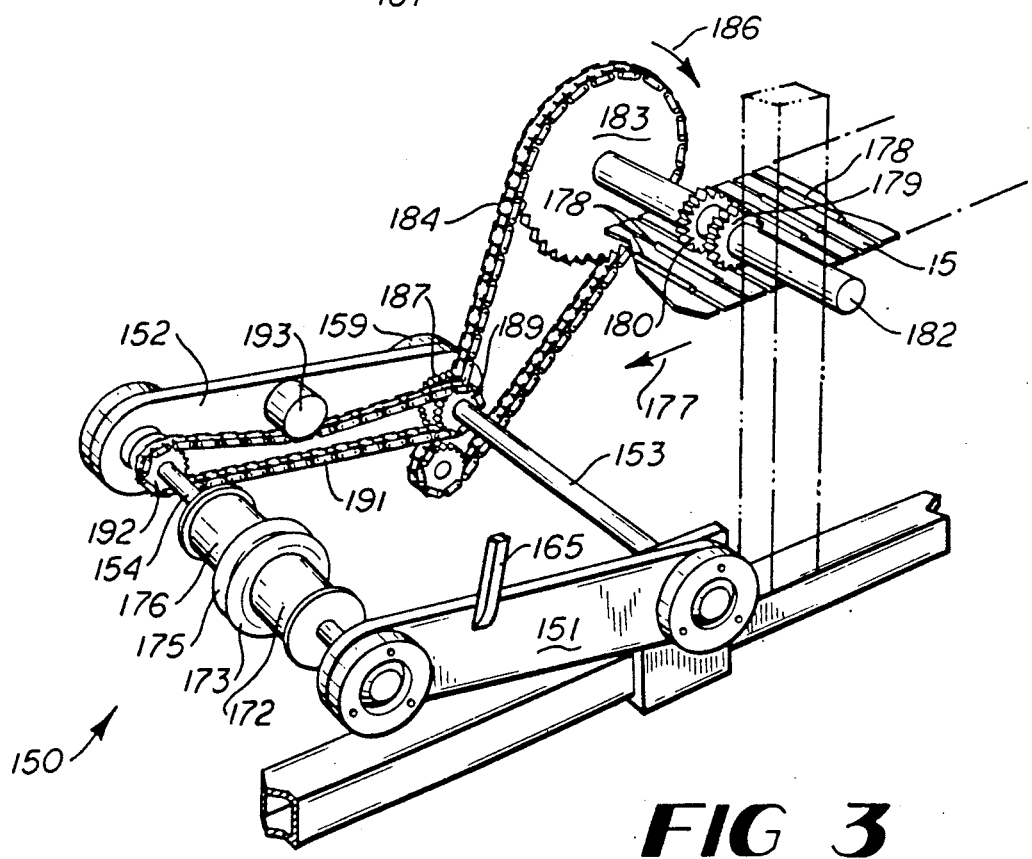
FIG. 3 is a schematic, perspective illustration of a portion of the filleting system of FIG. 1.

As shown in FIG. 1, a swivelling breast meat cutting assembly 150 is mounted to the framework 11. The swivelling cutting assembly 150 is positioned in the path of the carcass carriers 20 between stationary blades 46 and the fillet catcher 116, generally in the vicinity and beneath tunnel assembly 96. Swivelling cutting assembly 150 (FIGS. 2 and 3) includes a pair of elongated swivelling plates 151 and 152 mounted slightly outboard of the framework 11. The swivelling plates 151 and 152 are linked by a rigid axle 153 and a rotatable shaft 154. The rigid axle 153 is rotatably mounted to the framework 11 by bearings near each end of the axle, with each bearing being mounted to the framework 11 by a bearing plate, such as bearing plate 156. The swivel plates 151 and 152 are rotatably mounted to the rigid axle by bearings 158 and 159. In this way, the swivel plates 151 and 152 can swivel with respect to the framework 11 and with respect to the rigid axle 153.

The swivel plates 151 and 152 are moveably supported about the rigid axle by air cylinders 161 and 162. Each air cylinder is mounted to the framework 11 by means of a bracket, such as bracket 163. An opposite end of each air cylinder is mounted to the swivel plate by means of extension arms 165, 166. The air cylinders are connected to a suitably controlled source of air pressure by means of air conduits 167, 168 so that the air cylinders can be extended or retracted. The throw of the air cylinders can be adjusted to accommodate different size birds. As the air cylinders are extended or retracted, the swivel plates 151 and 152 are swivelled about the rigid axle 153 direction.

Figure 4:
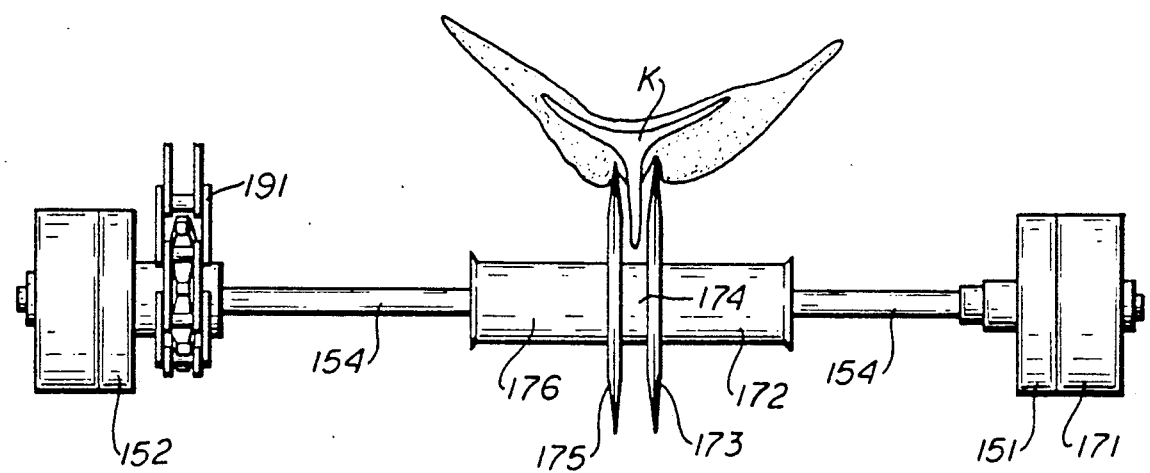
FIG. 4 is a detail illustration of a portion of the filleting system of FIG. 1, demonstrating how a portion thereof engages the poultry carcass.

Rotatable shaft 154 extends between the swivel plates 151 and 152 generally distal from rigid axle 153. The rotatable shaft 154 is rotatably mounted to each of the swivel plates 151 and 152 by suitable bearings, such as bearing 171. Mounted in succession between the swivel plates upon the rotatable shaft 154 are a first collar 172, a first rotary disc cutter 173, a spacer 174, a second rotary disc cutter 175 and a second collar 176. As shown in FIG. 4, the rotary disc cutters 173 and 175 are mounted parallel to each other and are adapted to straddle the keel bone K of the poultry carcass. The swivelling cutting assembly 150 is sized and positioned so that the rotary cutting blades 173 and 175 are positioned adjacent and below the tunnel assembly 96.

As the lower flight 15 of the conveyor system moves in the lower direction as depicted by arrow 177, the rotatable shaft 154 is driven as follows. (See FIG. 3.) Teeth 178 mounted to the conveyor system 12 engage sprockets 179 and 180 mounted on a power takeoff shaft 182, thereby causing the sprockets and the power takeoff shaft to rotate. Shaft 182 drives a large sprocket 183 which in turn drives a first power transmission chain 184. As the lower flight 15 of the conveyor system moves in the forward direction of the arrow 177 the sprocket 183 and chain 184 are driven in the clockwise direction of arrow 186. The clockwise motion of chain 184 is used to drive a small sprocket 187 in a clockwise direction. The small sprocket 187 is rigidly mounted to the axle 153 which also carries a second small sprocket 189. The small sprocket 189 drives a second power transmission chain 191 which in turn drives a driven sprocket 192. Driven sprocket 192 is rigidly mounted to the rotatable shaft 154. A chain tensioner 193 is positioned between the driven sprocket 192 and small sprocket 189 and keeps tension in the chain 191.

With this power transmission construction, the rotary cutting blades 173 and 175 are caused to rotate in a manner in which the top of the blades (the portion of the blade nearest the poultry carcass) moves in the same direction as the poultry carcass, albeit somewhat faster. It has been found that rotating the cutting blades in this manner tends to provide a smoother cutting action and avoids tearing of the meat.

OPERATION

In use, the poultry breast filleting system operates to separate the breast meat from the skeletal structure of the carcass in the manner disclosed in U.S. Pat. No. 4,682,386. As the substantially separated breast meat exits the tunnel assembly 96, the swivelling cutting assembly 150 can alternately be used to split the meat into two portions or can be moved to a position to allow the meat to pass thereby in one piece.

With the air cylinders 161 and 162 supplied with suitable air pressure, the swivel plates 151 and 152 are moved to the raised position which places the rotary cutting blades 173 and 174 under and adjacent the tunnel assembly 96. In this position, as the poultry carcass moves through the tunnel assembly, the rotary cutting blades 173 and 175 cut the breast meat from along the keel bone of the poultry carcass, thereby separating the breast meat into two portions and further separating the breast meat from the skeletal structure of the carcass. The air cylinders 161 and 162 provide some compliance for the swivelling cutting assembly 150 so that an oversized bird passing through the system tends to push down slightly on the cutting blades.

Of course, with the air pressure removed from the air cylinders 161 and 162, the swivelling cutting assembly 150 is moved to a retracted or lowered position in which the poultry carcasses and the breast meat progress thereby without engaging the rotary cutting blades.

While the present invention has been described in a preferred form, it will be readily apparent to those skilled in the art that many modifications, additions and deletions may be made therein without departing from the spirit and scope of the invention as set forth in the following claims.

I claim:

1. In a filleting apparatus for removing meat fillets from previously eviscerated poultry carcasses from which the legs, wings and skin have been previously removed, the apparatus having a frame and having a plurality of carcass carriers mounted at spaced intervals on a movable conveyor for moving the carriers along a path and meat removing means mounted along the path formed with a shape that corresponds to the profile of the skeletal structure of the poultry for partially separating at least a portion of the meat of the carcass from the skeletal structure thereof, the improvement comprising,
cutting means having a first position interposed in the path of the carcass carriers for engaging and cutting the partially separated meat into at least two substantially boneless portions along a portion of the skeleton of the carcass, a second position removed from the path of the carcass carriers, and
means for moving said cutting means between said first and second positions for selectively cutting the meat.

2. In a filleting apparatus, the improvement as claimed in claim 1 wherein said cutting means comprises first and second cutters spaced apart transversely of the path.

3. In a filleting apparatus, the improvement as claimed in claim 2 wherein the spacing of the cutters is sufficient to permit the cutters to straddle a longitudinally extending skeletal portion of the breast of the carcass.

4. In a filleting apparatus for removing meat fillets from the previously eviscerated poultry carcasses from which the legs, wings and skin have been previously removed, the apparatus having a frame and having a plurality of carcass carriers mounted at spaced intervals on a movable conveyor for moving the carriers along a path and meat removing means mounted along the path formed with a shape that corresponds to the profile of the skeletal structure of the poultry for partially separating at least a portion of the meat of the carcass from the skeletal structure thereof, the improvement comprising,
cutting means adapted to be interposed in the path of the carcass carriers for engaging and cutting the partially separated meat into two portions along a portion of the skeleton of the carcass, said cutting means being mounted at one end of a pivotable arm, pivotally mounted at its opposite end to the frame.

5. In a filleting apparatus, the improvement as claimed in 4 and further including means for moving said pivotable arm to position said cutting means in the path of the carcass carriers.

6. In a filleting apparatus, the improvement as claimed in claim 5 wherein said means for moving comprises a pneumatic piston and cylinder assembly having a first end attached to the frame and a second end pivotally attached to said arm.

7. In a filleting apparatus, the improvement as claimed in claim 2 wherein said first and second cutters are disc cutters, a portion of which engage the carcass.

8. In a filleting apparatus, the improvement as claimed in claim 7 and further including means for rotatably driving said disc cutters.

9. In a filleting apparatus for removing meat fillets from the previously eviscerated poultry carcasses from which the legs, wings and skin have been previously removed, the apparatus having a frame and having a plurality of carcass carriers mounted at spaced intervals on a movable conveyor for moving the carriers along a path and meat removing means mounted along the path formed with a shape that corresponds to the profile of the skeletal structure of the poultry for partially separating at least a portion of the meat of the carcass from the skeletal structure thereof, the improvement comprising,
cutting means adapted to be interposed in the path of the carcass carriers for engaging and cutting the partially separated meat into two portions along a portion of the skeleton of the carcass,
said cutting means comprising first and second disc cutters spaced apart transversely, a portion of which engages the carcass, and means for rotatably driving said disc cutters, said means for rotatably driving said disc cutters driving them in such a manner that the meat engaging portion thereof moves in the same direction as the movement of the carriers.

10. In a filleting apparatus for removing meat fillets from the previously eviscerated poultry carcasses from which the legs, wings and skin have been previously removed, the apparatus having a frame and having a plurality of carcass carriers mounted at spaced intervals on a movable conveyor for moving the carriers along a path and meat removing means mounted along the path formed with a shape that corresponds to the profile of the skeletal structure of the poultry for partially separating at least a portion of the meat of the carcass from the skeletal structure thereof, the improvement comprising,
cutting means adapted to be interposed in the path of the carcass carriers for engaging and cutting the partially separated meat into two portions along a portion of the skeleton of the carcass,
movable means for supporting said second means in the said path and for removing said second means from said path,
said movable means comprising an arm having a first end pivotally mounted to said frame and a second end to which said second means is mounted.

11. A filleting apparatus as claimed in claim 10 and further including positioning means for moving said arm between a first, disengaging, position and a second, engaging position.

12. A filleting apparatus as claimed in claim 11 wherein said positioning means comprises a cylinder and piston assembly having one end mounted to said frame and a second end pivotally mounted to said arm.

13. A filleting apparatus as claimed in claim 12 wherein said cylinder and piston assembly is pneumatically actuated.

14. An attachment for use with a filleting apparatus of type for removing fillets from previously eviscerated poultry carcasses from which the legs, wings and skin have been previously removed, the apparatus having a frame and having a plurality of carcass carriers mounted at spaced intervals on a movable conveyor for moving the carriers along a path and meat removing means mounted along the path formed with a shape that corresponds to the profile of the skeletal structure of the poultry for partially separating at least a portion of the meat of the carcass from the skeletal structure thereof, the attachment comprising, first and second cutting members adapted to be interposed in the path of the carcass carriers for cutting the partially separated meat into two portions along a portion of the skeleton of the carcass, and a pair of pivotable support arms for mounting said cutting means in the path of the carcass carriers.

15. The attachment as recited in claim 14, and further including a cylinder and piston assembly having a first end attached to the frame and a second end pivotably attached to each of said support arms, for moving said support arms to position said cutting means in the path of the carcass carriers.

16. The attachment as recited in claim 14 and further including means for rotating said first and second cutting members to facilitate cutting the meat.

17. A method of filleting previously eviscerated poultry carcasses with wings and legs removed comprising the steps of:

mounting the carcasses on a series of carcass carriers;

moving the carcass carriers each with a poultry carcass mounted thereon along a processing path to a first meat removing member that defines a passage corresponding to the profile of the poultry carcass to separate the meat from the skeletal structure of the carcass;

selectively engaging the breast meat of the carcass with a meat cutting means to separate the breast meat;

stripping the breast meat from the skeletal structure of the carcass;

wherein the step of selectively engaging the breast meat of the carcass includes raising the meat cutting means into the path of movement of the carcass, rotating the meat cutting means in the direction of movement of the carcass, and cutting through the meat of the breast of the carcass so as to separate the meat of the breast.

18. A method of filleting previously eviscerated poultry carcasses with wings and legs removed comprising the steps of:

mounting the carcasses on a series of carcass carriers;

moving the carcass carriers each with a poultry carcass mounted thereon along a processing path to a first meat removing member that defines a passage corresponding to the profile of the poultry carcass to separate the meat from the skeletal structure of the carcass;

wherein the step of selectively engaging the breast meat of the carcass includes moving the meat cutting means out of the path of movement of the carcass so that the breast meat of the carcass remains uncut.

* * * * *